(No Model.)
G. McINTOSH.
ELECTRIC SIGNAL.
No. 485,352.
Patented Nov. 1, 1892.
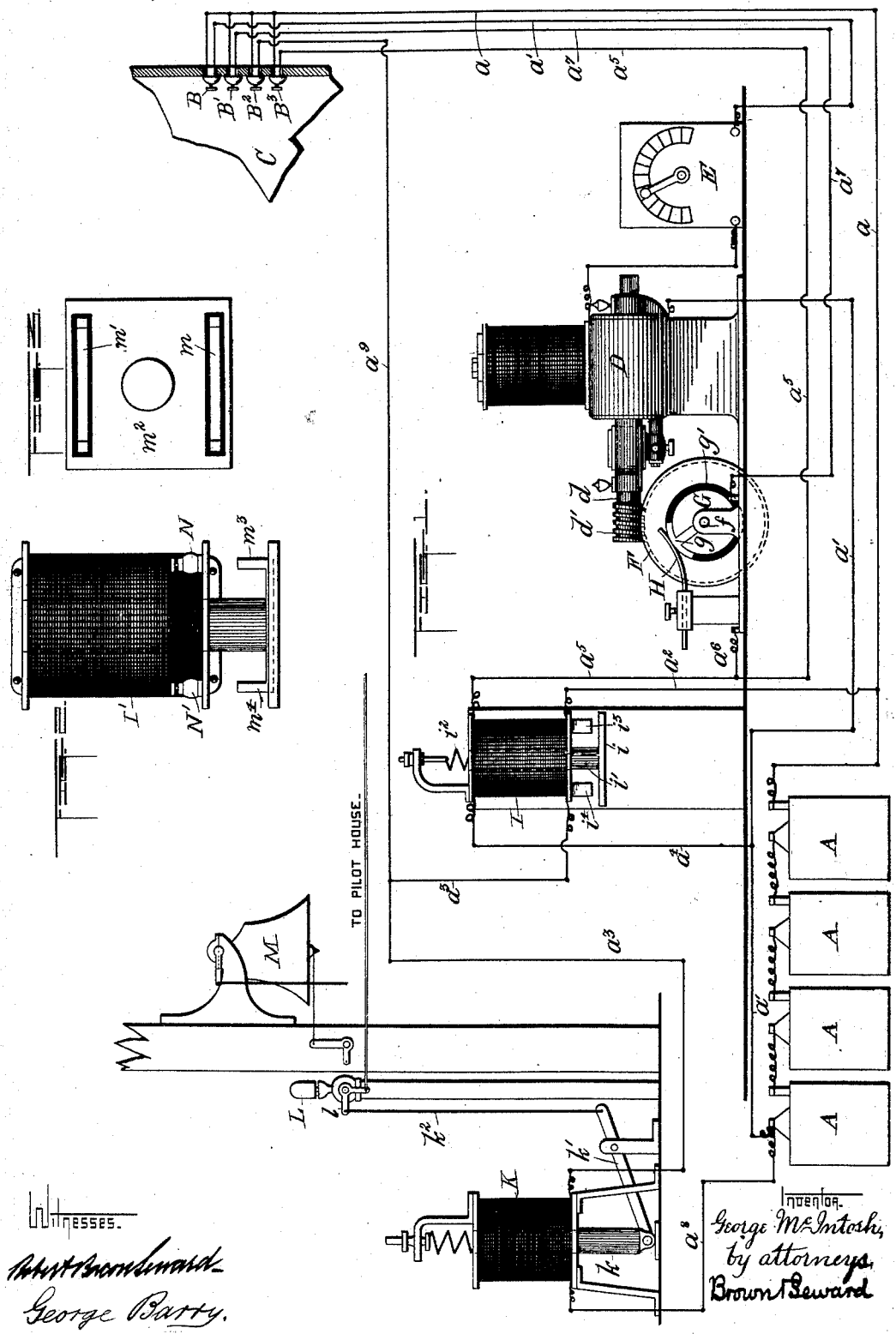
Witnesses.
Robert Brown Seward
George Barry.
Inventor.
George McIntosh,
by attorneys
Brown & Seward

UNITED STATES PATENT OFFICE.

GEORGE McINTOSH, OF STONINGTON, CONNECTICUT.

ELECTRIC SIGNAL.

SPECIFICATION forming part of Letters Patent No. 485,352, dated November 1, 1892.

Application filed March 10, 1892. Serial No. 424,386. (No model.)

*To all whom it may concern:*

Be it known that I, GEORGE McINTOSH, of Stonington, in the county of New London and State of Connecticut, have invented a new and useful Improvement in Electric Signals, of which the following is a specification.

My invention relates to an improvement in electric signals in which the signal is operated at intervals by the alternate energizing and de-energizing of the electro-magnet under the control of a circuit maker and breaker operating continuously by a motor.

The object is to provide an auxiliary circuit of low amprage through the commutator operated by the motor, which auxiliary circuit shall make and break the circuit of high amprage for directly operating the signal.

A practical embodiment of my invention is represented in the accompanying drawings, in which—

Figure 1 represents the motor, the commutator, the auxiliary circuit, the signal-operating circuit, the signal, the battery, and the several connections for completing the circuits; and Figs. 2 and 3 represent enlarged views in detail of a modified form of armature for the electro-magnet of the auxiliary circuit, by means of which a plurality of main circuits are simultaneously closed and broken instead of a single one.

My invention is represented as applied to the sounding of a steam-whistle—as, for example, on a steamer during a fog or whenever for any cause it is desired to sound blasts at predetermined intervals.

The several cells of the battery are represented by A. The wire $a$ leads from one pole of the battery to a switch B, located, for example, in the pilot-house C, a portion only of which is here represented. The opposite pole of the battery is connected by a wire $a'$ with the opposite contact-plate of the switch B, and in its course includes an electromotor D, of any well-known or approved construction, and a resistance device E of ordinary form. From this it follows that by closing the switch B the electric motor D will be set in motion, and in the form of motor which I have here represented will rotate the shaft $d$, which is provided with a worm $d'$, engaged with a worm-wheel F, mounted on a shaft $f$ and having fixed to rotate therewith a commutator G.

The commutator G consists of a wheel or disk the periphery of which is provided throughout a certain portion of its extent with a conducting material $g$, and throughout another portion of its extent with insulating material $g'$. A brush H is adapted to rest in contact with the periphery of the commutator G and alternately make contact with the conducting and non-conducting portions of the periphery of said commutator.

The electro-magnet of the auxiliary circuit is represented by I, and is provided with an armature $i$, attached to the core $i'$ of the magnet, the latter being hung by a spring $i^2$ so as to have a longitudinal reciprocating movement within the magnet to bring the armature $i$ into and out of engagement with contact-posts $i^3$ and $i^4$, the former in electrical communication with the wire $a$ through the wire $a^2$, and the latter in electrical communication with the signal-operating magnet K through a wire $a^3$. The magnet I of the auxiliary circuit is electrically connected by a wire $a^4$ with the wire $a'$, leading to one pole of the battery A, and by a wire $a^5$ with a switch $B^3$, located within the pilot-house, and also by a branch wire $a^6$ with the brush of the commutator, the conducting portion $g$ of said commutator being in electrical communication through a wire $a^7$ with a switch B' in the pilot-house. The opposite contact-plates of the switches $B^3$ and B' are connected with the common wire $a$, leading to the battery.

The magnet K for operating the whistle is provided with a longitudinally-reciprocating core $k$, connected with an end of an operating-lever $k'$, which latter is connected by a rod $k^2$ with a valve-operating lever $l$ for regulating the admission of steam to sound the whistle L. The opposite pole of the magnet K is connected with the opposite pole of the battery A by a wire $a^8$.

From the above it will be observed that the electric circuit through the signal-operating magnet K and the battery is completed when the armature $i$ of the auxiliary magnet I is in engagement with the contact-posts $i^3$ and $i^4$. When such circuit is complete, it will energize the magnet K and lift the core $k$, thereby opening the valve and sounding the signal. It, moreover, follows that the magnet I will be energized and the armature $i$ lifted into engagement with the posts $i^3$ and $i^4$ whenever the circuit through said magnet I is completed by the engagement of the brush H with the conducting portion $g$ of the commutator G, provided the switch B' has been closed. It will therefore be seen that when the motor D has been set in motion and the switch B' closed the circuit through the signal-operating magnet K will be completed and the signal sounded as often as the conducting portion $g$ of the commutator comes in contact with the brush H, and that the length of time which the signal will sound will depend upon the length of conducting-surface $g$ on the periphery of the commutator, the speed of the commutator remaining constant.

By the switch $B^3$ and its connections the circuit may be completed directly through the auxiliary electro-magnet I, exclusive of the commutator, and the signal would continue so long as such switch remained closed.

By means of the switch $B^2$ and its connections with the wire $a$, leading to one pole of the battery, and with a wire $a^9$, leading directly to the operating-magnet K, the circuit may be completed directly through the operating-magnet, exclusive of both the commutator and the auxiliary magnet.

While I have shown the signal connected with the operating-magnet as a steam-whistle, it is obvious that the same mechanism might be employed to sound a bell—as, for example, the bell M.

Where it is desired to operate a flash-light in connection with the sounding of the signal, the auxiliary magnet I may be provided with a plurality of circuit-closers—as, for example, $m$ and $m'$ (see Fig. 3)—carried by a plate $m^2$, connected with the core of the magnet and provided with contact-posts $m^3$ and $m^4$—two for each contact-piece $m$ and $m'$—adapted to make contact with the binding-posts N N' whenever the magnet I', Fig. 2, is energized. The circuit-closers $m$ and $m'$ may be insulated from each other.

By making the auxiliary magnet I capable of transmitting a current of low amperage only I am enabled to pass a light current through the commutator and its brush, and thereby prevent burning out of the contacts, while at the same time a current of great amperage may be passed from the same battery through the signal-operating magnet K.

What I claim is—

1. In combination, the signal, the electro-magnet of greater amprage for operating the signal, an auxiliary electro-magnet of lesser amprage, a commutator, a switch, a source of electricity, an electric circuit complete through the signal-operating magnet, and a circuit-closer under the control of the core of the auxiliary magnet, a second circuit complete through the auxiliary magnet, the commutator, and the switch, and a motor for operating the commutator, substantially as set forth.

2. In combination, a signal, an electro-magnet for operating the signal, an auxiliary electro-magnet, a plurality of circuit-closers under the control of said auxiliary electro-magnet, a commutator, a motor for continuously moving the commutator, a source of electricity, an electric circuit complete through the signal-operating magnet, and one of the circuit-closers under the control of the auxiliary magnets, a second circuit complete through the auxiliary magnet and commutator, and a third circuit complete through the motor, substantially as set forth.

GEORGE McINTOSH.

Witnesses:
 FREDK. HAYNES,
 I. B. DECKER.